US009304780B2

(12) United States Patent
Srinivasan et al.

(10) Patent No.: US 9,304,780 B2
(45) Date of Patent: Apr. 5, 2016

(54) USER INITIATED DATA ROLLBACK USING OPERATING SYSTEM PARTITIONS

(71) Applicant: Google Inc., Mountain View, CA (US)

(72) Inventors: Jayendran Srinivasan, Milpitas, CA (US); Chris Brian Sosa, Sunnyvale, CA (US); Ryan Cairns, Los Altos, CA (US); Paul Allan Covell, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/058,173

(22) Filed: Oct. 18, 2013

(65) Prior Publication Data

US 2015/0113261 A1 Apr. 23, 2015

(51) Int. Cl.
*G06F 1/24* (2006.01)
*G06F 9/44* (2006.01)

(52) U.S. Cl.
CPC .................. *G06F 9/4406* (2013.01)

(58) Field of Classification Search
CPC ..... G06F 9/4411; G06F 9/441; G06F 9/4406; G06F 9/445
See application file for complete search history.

(56) References Cited

U.S. PATENT DOCUMENTS

| | | | |
|---|---|---|---|
| 2002/0138592 A1* | 9/2002 | Toft | 709/219 |
| 2004/0153718 A1* | 8/2004 | Shen et al. | 714/5 |
| 2004/0153724 A1* | 8/2004 | Nicholson et al. | 714/6 |
| 2004/0158699 A1* | 8/2004 | Rhoads et al. | 713/1 |
| 2005/0223268 A1* | 10/2005 | Tchen et al. | 714/6 |
| 2007/0174361 A1* | 7/2007 | Branda et al. | 707/204 |
| 2010/0241839 A1* | 9/2010 | Banga et al. | 713/2 |
| 2011/0016302 A1* | 1/2011 | Amou | 713/2 |
| 2011/0055714 A1* | 3/2011 | Vemulapalli et al. | 715/739 |
| 2012/0297180 A1* | 11/2012 | Teng et al. | 713/2 |
| 2013/0103937 A1* | 4/2013 | Kumagai | 713/2 |

OTHER PUBLICATIONS

"Welcome to the Chrome OS wiki—A site maintained by a network of Chrome users—Developer Mode", Chrome OS Wiki, retrieved Aug. 27, 2013, 5 pages, <https://sites.google.com/site/chromeoswikisite/home/what-s-new-in-dev-and-beta/developer-mode>.
GitHub, "Add xephyr target for running a nested X server, primarily for ARM," <https://github.com/dnschneid/crouton/commit/095b43cb83b11aafb954b53d5d50940e2567ab9e#diff-05db2d9ce0ac06403075a1a322c0027eR149>, Jan. 8, 2013, 4 pages.
Ask Ubuntu, "How to Switch Between Operating Systems Without Reboot?" <http://askubuntu.com/questions/4400/how-to-switch-between-operating-systems-without-reboot>, visited Nov. 5, 2014, 2 pages.

(Continued)

*Primary Examiner* — Kim Huynh
*Assistant Examiner* — Paul J Yen
(74) *Attorney, Agent, or Firm* — McDermott Will & Emery LLP (57) ABSTRACT

Methods for returning a computing system to a previous state are provided. In one aspect, a method includes loading a second system state of a second operating system partition, and receiving a request to return to a first system state of a first operating system partition while operating in a second system state of the second operating system partition. The method also includes loading the first system state of the first operating system partition. Systems and machine-readable media are also provided.

14 Claims, 5 Drawing Sheets

(56) References Cited

OTHER PUBLICATIONS

Kendrick, "Chromebook Pixel: Run Ubuntu alongside Chrome OS," <http://www.zdnet.com/chromebook-pixel-run-ubuntu-alongside-chrome-os-7000012381/,> Mar. 11, 2013, 10 pages.

Answers Yahoo, "How to Switch Between Two Operating Systems Without Reboot?" <https://answers.yahoo.com/question/index?qid=20130504144904AAVWZM4>, visited Nov. 5, 2014, 2 pages.

* cited by examiner

USER INITIATED DATA ROLLBACK USING OPERATING SYSTEM PARTITIONS

BACKGROUND

1. Field

The present disclosure generally relates to computing devices, and more particularly to the provision of data on a computing device.

2. Description of the Related Art

Computing systems commonly load (e.g., download) software updates in order to keep an installed application current and secure. In many instances, the update or other modification may be loaded for an operating system of a computer. Certain systems permit the update or other modification to be uninstalled or otherwise unloaded if the update or other modification is insubstantial in order to return the system to a previous state. The process and time required for unloading such an insubstantial update or modification is nonetheless commonly very long, and in some instances the unloading may be unsuccessful. In instances where the update for the system is substantial, many systems do not permit the update to be uninstalled or otherwise unloaded because the system has changed too extensively as a result of the update such that the system cannot return to a previous state.

SUMMARY

According to certain embodiments of the present disclosure, a computer-implemented method for returning a computing system to a previous state is provided. The method includes loading a second system state of a second operating system partition, and receiving a request to return to a first system state of a first operating system partition while operating in a second system state of the second operating system partition. The method also includes loading the first system state of the first operating system partition.

According to certain embodiments of the present disclosure, a system for returning a computing system to a previous state is provided. The system includes a memory that includes a first operating system partition and a second operating system partition. The first operating system partition includes a first system state, and the second operating system partition includes a second system state. The system also includes a processor. The processor is configured to load the second system state of the second operating system partition, and receive, from a user using an input device while operating in the second system state of the second operating system partition, a request to return to the first system state of the first operating system partition. The processor is also configured to load the first system state of the first operating system partition.

According to certain embodiments of the present disclosure, a machine-readable storage medium includes machine-readable instructions for causing a processor to execute a method for returning a computing system to a previous state is provided. The method includes receiving a first request to apply a modification to a second operating system partition while operating in a first system state on a first operating system partition, and applying a modification to the second operating system partition while operating in the first system state on the first operating system partition in order to generate a second system state of the second operating system partition. The method also includes loading the second system state of the second operating system partition and receiving a request to return to the first system state of the first operating system partition while operating in the second system state of the second operating system partition. The method further includes loading the first system state of the first operating system partition.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing, from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system includes at least two operating system partitions, a first operating system partition for an initial operating system that is actively running and a second operating system partition for loading a modification to the initial operating system. When the modification has successfully loaded and installed on the second operating system partition, the system reboots with the second operating system partition, thus permitting a user of the system to use the modified operating system of the second operating system partition. The user, however, may desire to return to the initial operating system, for instance where the modified operating system lacks or otherwise does not permit use of a feature or application previously usable with the initial operating system. In such instances the user may select an option in the actively running modified operating system of the second operating system partition to reboot with the first operating system partition and return the user of the system to the actively running initial operating system of the first operating system partition.

After rebooting, with the first operating system partition, the system remains aware that the user has rejected the previously loaded modification and restricts the same modification from again being loaded and installed. If however, another modification for the system subsequently becomes available, the system permits the other modification to be downloaded and installed to the second partition so that the system may again reboot with the second partition.

Figure 1:
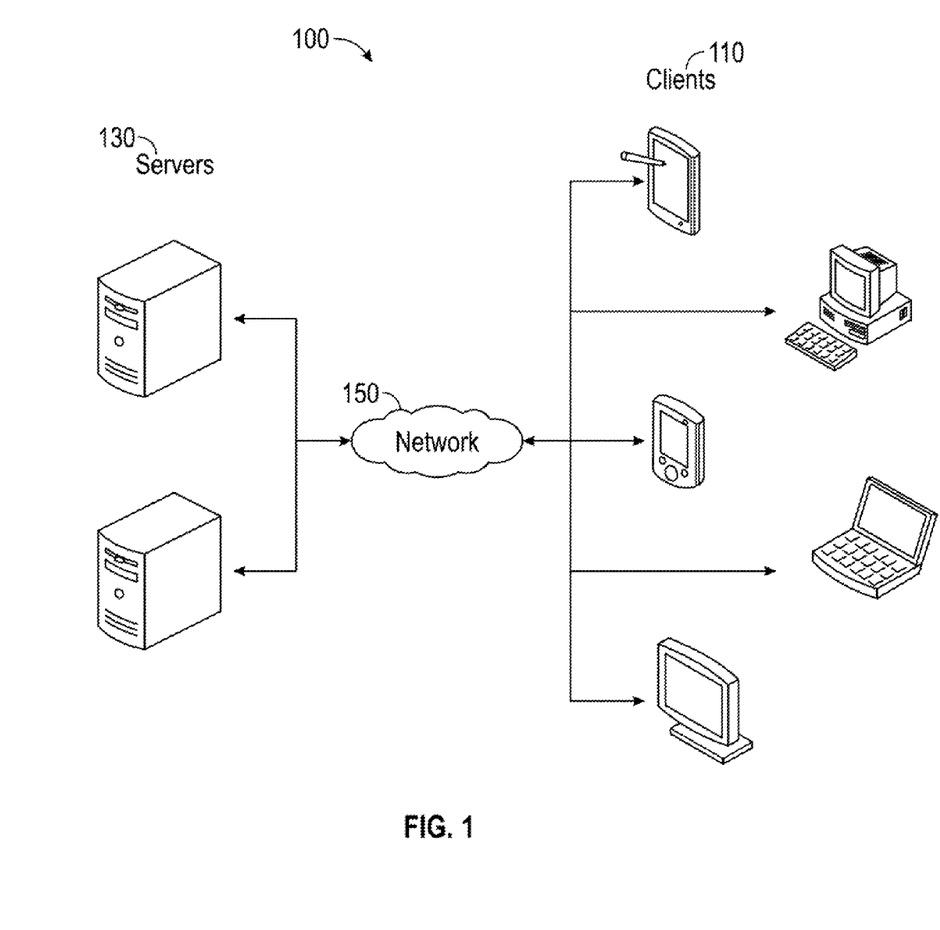
FIG. 1 illustrates an example architecture for returning a computing system to a previous state.

FIG. 1 illustrates an example architecture 100 for returning a computing system to a previous state. The architecture 100 includes servers 130 and clients 110 connected over a network 150.

Each of the clients 110 is configured to run software, such as an operating system, and includes at least two partitions. The partitions can be, for instance, operating system partitions. The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities for running software such an operating system.

The clients 110 are connected to servers 130 over a network 150. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to any one or more of the following network topologies, including a bus network, a star network, a ring network, a mesh network, a star-bus network, tree or hierarchical network, and the like.

One of the many servers 130 is configured to host data fir updating, or otherwise modifying the software on the clients 110. For instance, when an update is available for an operating system of the clients 110 to update the operating system from a first state to a second state, each client 110 may download the update from a server 130 over the network 150 to an inactive (e.g., not currently being used to run an active operating system) operating system partition. Once the update is downloaded, each client 110 can reboot with the operating system partition to which the update was downloaded and run the operating system of the second (e.g., updated) state. If a user of a client 110 wishes not to use the operating system of the second state, the user may indicate using a keystroke or other input that the user seeks to use the operating system of the first state (e.g., without the update). The client 110 may then reboot with the other operating system partition on which is the operating system of the first state and have substantially immediate access (e.g., without the need to uninstall software) to the operating system of the first state upon reboot.

For purposes of load balancing, multiple servers 130 can host the data for updating the software. The servers 130 can be any device having an appropriate processor, memory, and communications capability for hosting data for updating software running on the clients 110.

Figure 2:
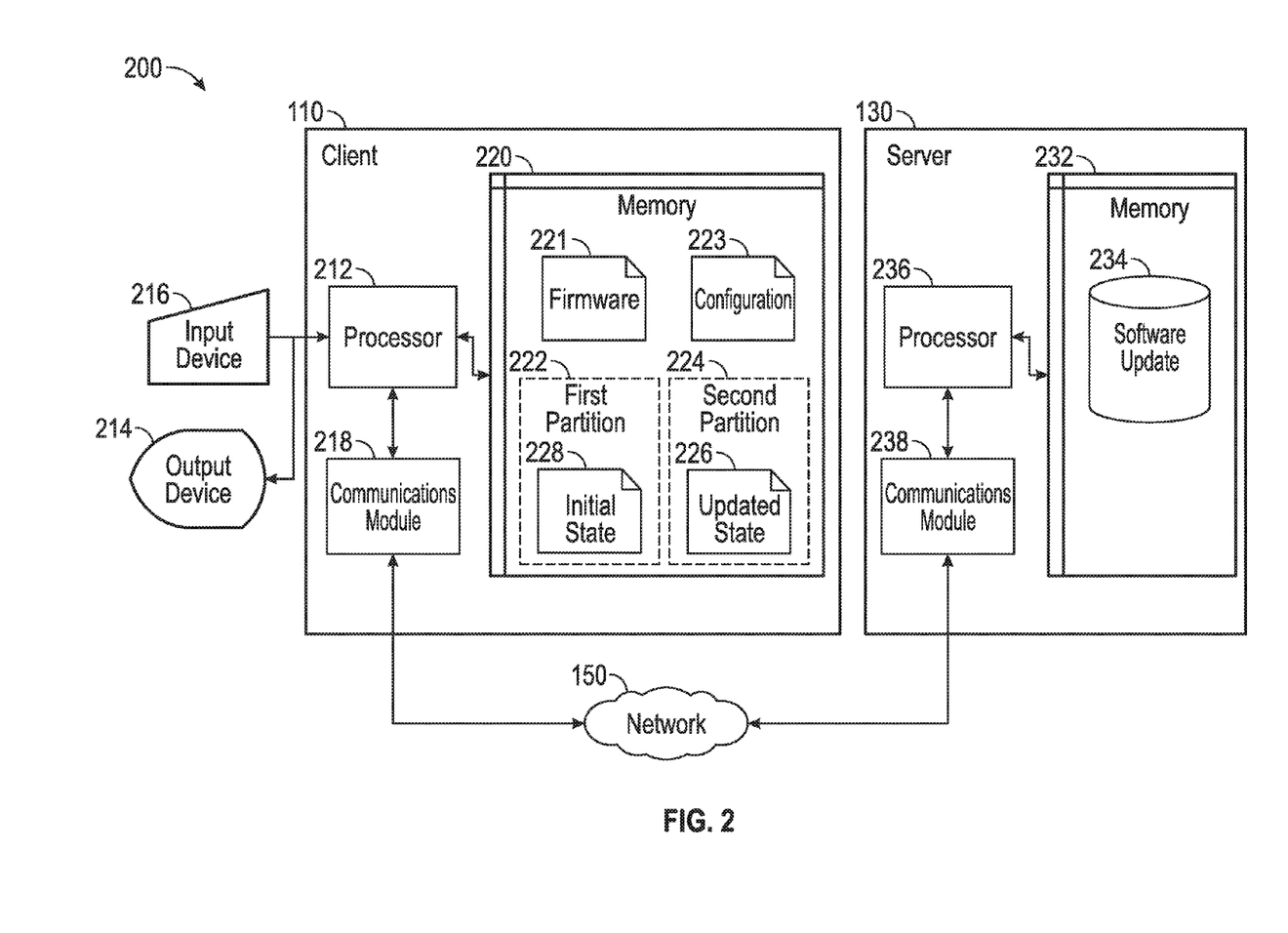
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and memory 220 that includes firmware 221, configuration 223 information, a first partition 222 (e.g., a first operating system partition), and a second partition 224 (e.g., a second operating system partition). The first partition 222 includes an initial state 228 (e.g., of an operating system) (or "first system state"). The second partition 224 is configured to include an updated state 226 (e.g., of the operating system) (or "second system state") based on a software update 234 provided from a memory 232 of the server 130 over the network 150. Although the examples provided for the first and second partitions 222 and 224 are operating system partitions, and the example initial state 228 and updated state 226 refer to states of an operating system, other types of software (e.g., other software applications) can be configured for use with the disclosed system for returning the client 110 to a previous state.

The firmware 221 in the memory 220 can be a Basic Input Output Software or "BIOS" of the client 110. The configuration 223 in the memory 220 includes, for instance, information indicative of user settings, user preferences, operating system settings, and other information to be accessible to both the first partition 222 and the second partition 224. The client 110 also includes an input device 216, such as a keyboard or mouse, and an output device 214, such as a display.

The processor 212 of the client 110 is configured to execute instructions, such as instructions physically coded into the processor 212, instructions received from software in memory 220, or a combination of both, to return the client 110 to a previous state (e.g., to the initial state 228 of an operating system from the updated state 226 of the operating system). For example, the processor 212 of the client 110 executes instructions to load (e.g., reboot to) the updated state 226 of the second partition 224 (e.g., from the initial state 228 of the first partition 222). This may occur, for instance, where the client 110 is instructed to reboot while operating in the initial state 228 of the first partition 222 in response to the updated state 226 being loaded and applied to the second partition 224.

The processor 212 of the client 110 can load (e.g., download) the updated state 226 to the second partition 224 by applying the software update 234 (or "modification") to the second partition 224 while operating in the initial state 228 on the first partition 222 in order to generate the updated state 226. For instance, the updated state 226 can be an updated version of an operating system that is updated based applying the software update 234 available on the server 130 to a copy of the version of the operating system currently stored on the first partition 222.

In certain aspects, the processor 212 of the client 110 is configured to load the updated state 226 to the second partition 224 in response to receiving a first request to apply the software update 234 to the second partition 224 while operating in the initial state 228 on the first partition 222 prior to the applying the software update 234 to the second partition 228. For instance, while operating in the initial state 228 on the first partition 222 prior to the applying the software update 234 to the second partition 228, the processor 212 of the client 110 may check the server 130 to see if any software update is available for the initial state 228, and when the software update 234 for the initial state 228 is available, the processor 236 of the server 130 may send a request to the processor 212 of the client 110 to apply the software update 234 to the second partition 224 of the client 110. The processor 212 of the client 110 may be scheduled to periodically determine whether any software update is available for the initial state 228 (e.g., the software update 234 or any other software update) while operating in the initial state 228 on the first partition 222. For instance, an operating system of the client 110 may check the server 130 on an hourly or daily basis for updates for the operating system.

The processor 212 of the client 110 is configured to receive a request (e.g., using the input device 216) to return to the initial state 228 of the first partition 222 while operating in the updated state 226 of the second partition 224. The request to return to the initial state 228 of the first partition 222 while operating in the updated state 226 of the second partition 224 may be received from a user using the input device 216 while operating in the updated state 226 of the second partition 224. For instance, after the client 110 is rebooted from the initial state 228 of the first partition 222 to the updated state 226 of the second partition 224, the client 110 may receive an entry from the input device 216, such as a keystroke, indicating a request to return to the initial state 228 of the first partition 222. The keystroke can be, for instance, a combination of buttons pressed simultaneously and/or in sequence. The entry from the input device 216 may also be a selection of an interface (e.g., button) displayed on the output device 214 indicating the request to return to the initial state 228 of the first partition 222.

The request to return to the initial state 228 of the first partition 222 while operating in the updated state 226 of the second partition 224 may be recorded in the configuration 223 in the memory 220 of the client 110. In certain aspects where the software update 234 applied to generate the updated state 226 was downloaded from the server 130, the processor 212 may be configured to send a notification to the server 130 indicative of the request to return to the initial state 228. The server 130 may thus be made aware of instances where a client 110 seeks to "uninstall" or otherwise revert back to a state prior to an application of the software update 234.

The request to return, to the initial state 228 of the first partition 222 while operating in the updated state 226 of the second partition 224 may be received where, for example, the initial state 228 is configured to provide access to at least one feature that is inaccessible to the updated state 226. For example, an operating system of the client 110 running in the initial state 228 may have access to a feature or computing ability that becomes "broken" or otherwise inaccessible when the operating system is updated to the updated state 226.

The processor 212 of the client 110 is further configured to load the initial state 228 of the first partition 222 (e.g., in response to the request to return to the initial state 228 of the first partition 222). For example, upon reboot of the client 110, the firmware 221 instructs the processor 212 to boot from the first partition 222 instead of the second partition 224 in response to the request to return to the initial state 228 of the first partition 222.

In certain aspects, if the processor 212 subsequently receives a second request to apply the software update 214 to the second partition 224 while operating in the initial state 228 on the first partition 222 (e.g., after the request to return to the initial state 228 of the first partition 222 while operating in the updated state 226 of the second partition 224 has already been received), the processor 212 is configured to restrict application of the software update 234. This may occur based on a determination by the processor 212 of whether an indicator of a request to return to the initial state 228 while operating in the updated state 226 is stored in the configuration 223 in memory 220. Such restriction is helpful so as to avoid reapplication of the same software update 234 to the initial state 228 to reproduce the updated state 226 for which the request to return to the initial state 228 of the first partition 222 was received. For example, after the client 110 reverts to the initial state 228 from the updated state 226 by rebooting to the first partition 222 instead of the second partition 224, the operating system of the client 110 may proceed to continue to regularly check the server 130 for any software updates and find that the same software update 234 for the initial state 228 is available. The client 110 may then check the configuration 223 to determine that the client 110 has previously reverted to the initial state 228 in response to the software update 234, and thereafter not download the software update 234 until another, different software update is available.

Figure 3:
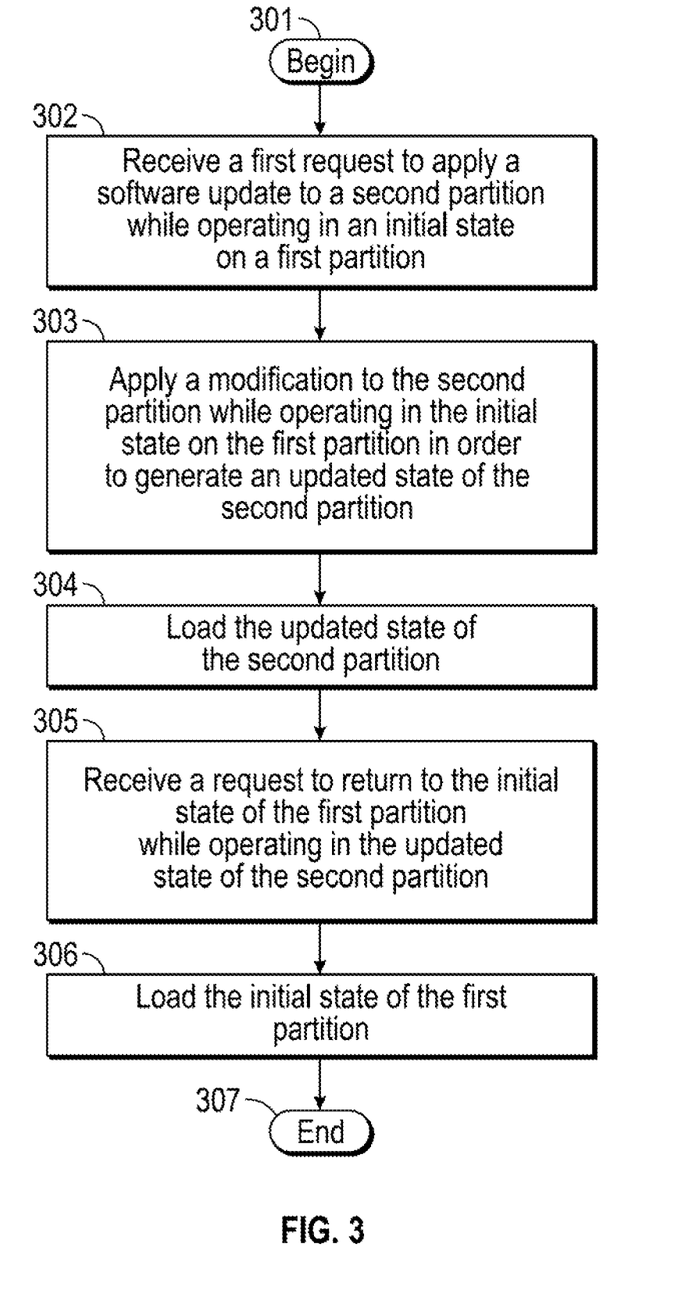
FIG. 3 illustrates an example process for returning a computing system to a previous state using the example client of FIG. 2.

FIG. 3 illustrates an example process for returning a computing system to a previous state using the example client 110 of FIG. 2. While FIG. 3 is described with reference to FIG. 2, it should be noted that the process steps of FIG. 3 may be performed by other systems. The process begins by proceeding from beginning step 301 when an initial state 228 of a first partition 222 in memory 220 of the client 110 is loaded on the client 110 to step 302 when a first request to apply a software update 234 to a second partition 224 in the memory 220 of the client 110 is received while the client 110 operates in the initial state 228 on the first partition 222. Next, in step 303, a software update 234 to the second partition 226 is applied while operating in the initial state 228 on the first partition 222 in order to generate an updated state 226 of the second partition 224. In step 304, the updated state 226 of the second partition 224 is loaded, and in step 305 a request to return to the initial state 228 of the first partition 222 is received while operating in the updated state 226 of the second partition 224. Subsequently, in step 306, the initial state 228 of the first partition 222 is loaded, and the process ends in step 307.

FIG. 3 set forth an example process for returning a computing system to a previous state using the example client 110 of FIG. 2. An example will now be described using the example process of FIG. 3, a client 110 that is a desktop computer, a software update 234 for an operating system called ChrX, an initial state 228 that is version 1.0 of ChrX, an update state 226 that is version 2.0 of ChrX, and first and second partitions 222 and 224 that are operating system partitions for ChrX.

The process begins by proceeding from beginning step 301 when the desktop computer 110 boots version 1.0 of ChrX 228 using the first operating system partition 222 in memory 220 of the desktop 110, to step 302 when version 1.0 of ChrX checks for an update on a server 130 and finds that a software update 234 for ChrX is available to be installed to a second operating system partition 224 in the memory 220 of the desktop computer 110, and subsequently downloads the software update 234 while the desktop computer 110 operates in version 1.0 of ChrX on the first operating system partition 222.

Next, in step 303, the software update 234 is applied to the second operating system partition 226 to generate version 2.0 of ChrX 226 while the desktop computer 110 continues to operate in version 1.0 of ChrX 228 on the first partition 222. In step 304, upon restarting, the firmware 221 of the desktop computer 110 boots with version 2.0 of ChrX 226 on the second operating system partition 226. A user then begins using version 2.0 of ChrX 226 and finds that a certain software application is not compatible with version 2.0 of ChrX 226, and in step 305 the user while using version 2.0 of ChrX 226 requests the desktop computer 110 to return to version 1.0 of ChrX 228 by inputting a keystroke using a keyboard 216.

Figure 4:
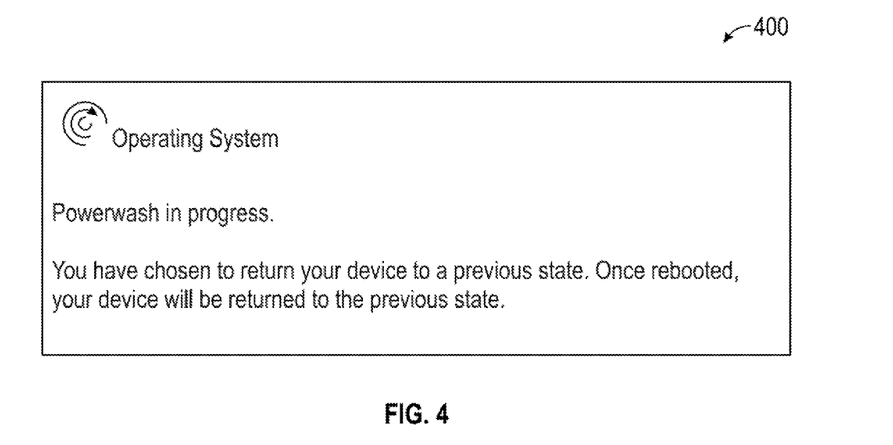
FIG. 4 is an example illustration associated with the example process of FIG. 3.

In response, a notification 400 indicating that the system will revert from version 2.0 of ChrX 226 to version 1.0 of ChrX 228 is provided for display on the output device 214 as provided in the example illustration of FIG. 4, and an indicator that the desktop computer 110 has reverted from version 2.0 of ChrX 226 to version 1.0 of ChrX 228 is stored in a configuration 223 file in the memory 220 of the desktop computer 110. Subsequently, in step 306, the desktop computer 110 reboots and upon restarting, the firmware 221 of the desktop computer 110 boots with version 1.0 of ChrX 228 on the first operating system partition 222 instead of version 2.0 of ChrX 226 on the second operating system partition 224, thereby returning the user to version 1.0 of ChrX 228 without the need for uninstalling software or performing other time consuming tasks. The process ends in step 307.

Figure 5:
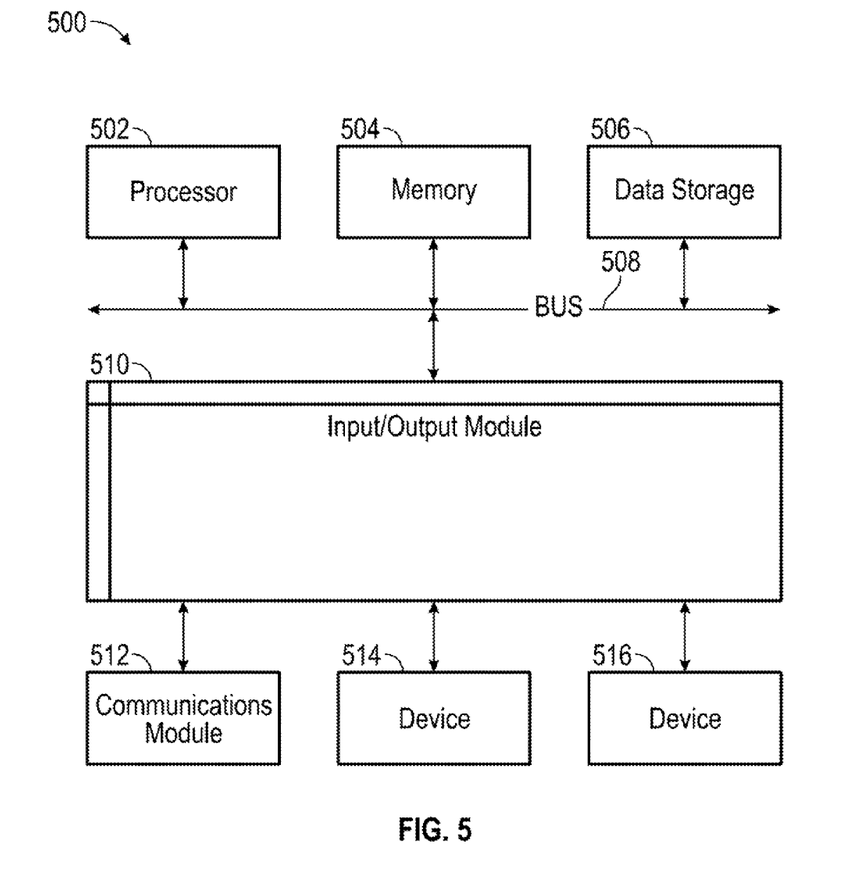
FIG. 5 is a block diagram illustrating an example computer system with which the client and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling, languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking internee cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. A reference to an element in the singular is not intended to mean "one and only one" unless specifically stated, but rather "one or more," The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for returning a computing system to a previous state, the method comprising:
   receiving a first request to apply, on a second storage partition while operating in a first system state of an operating system on a first storage partition, an update to the first system state of the operating system in order to generate a second system state of the operating system;
   loading on the second storage partition the second system state of the operating system;

receiving a request by a user to return to the first system state of the operating system stored on the first storage partition from the second system state while operating in the second system state of the operating system on the second storage partition;

loading the first system state of the operating system on the first storage partition based on the request by the user to return to the first system state of the operating system from the second system state;

subsequent to receiving the request to return to the first system state of the operating system, receiving a second request to apply, on the second storage partition while operating in the first system state of an operating system on a first storage partition, the update to the first system state of the operating system in order to generate the second system state of the operating system; and restricting application of the update to the first system state of the operating system stored on the first storage partition in order to generate the second system state of the operating system based on the request by the user to return to the first system state of the operating system from the second system state.

2. The method of claim 1, further comprising storing in memory an indicator of the request by the user to return to the first system state of the operating system while operating in the second system state of the operating system in response to receiving the request to return to the first system state of the operating system.

3. The method of claim 2, wherein application of the update is restricted based on a determination that the indicator of the request by the user to return to the first system state of the operating system while operating in the second system state is stored in the memory.

4. The method of claim 1, further comprising periodically determining whether at least one of the update or another update is available while operating in the first system state of the operating system on the first storage partition.

5. The method of claim 1, wherein the first request to apply the update to the second storage partition while operating in the first system state of the operating system is received from a server, and the method further comprises sending a notification to the server indicative of the request to return to the first system state of the operating system.

6. The method of claim 1, wherein the request by the user to return to the first system state of the operating system on the first storage partition while operating in the second system state of the operating system on the second storage partition is received within a user interface of the second system state of the operating system from the user using an input device while operating in the second system state of the operating system on the second storage partition.

7. The method of claim 1, wherein the first system state of the operating system is configured to provide access to at least one feature that is inaccessible by the second system state.

8. A system for returning a computing system to a previous state, the system comprising:
a memory comprising:
a first storage partition comprising a first system state of an operating system; and
a second storage partition; and
a processor configured to:
receive a first request to apply, on the second storage partition while operating in the first system state of the operating system on the first storage partition, an update to the first system state of the operating system in order to generate a second system state of the operating system;

load the second system state of the operating system on the second storage partition;

receive, from a user using an input device while operating in the second system state of the operating system on the second storage partition, a request to return to the first system state of the operating system from the second system state;

load the first system state of the operating system on the first storage partition based on the request by the user to return to the first system state of the operating system from the second system state;

subsequent to receiving the request to return to the first system state of the operating system, receive a second request to apply, on the second storage partition while operating in the first system state of an operating system on a first storage partition, the update to the first system state of the operating system in order to generate the second system state of the operating system; and restrict application of the update to the first system state of the operating system stored on the first storage partition in order to generate the second system state of the operating system based on the request by the user to return to the first system state of the operating system from the second system state.

9. The system of claim 8, further comprising storing in the memory an indicator of the request by the user to return to the first system state of the operating system while operating in the second system state of the operating system in response to receiving the request to return to the first system state of the operating system.

10. The system of claim 9, wherein application of the update is restricted based on a determination that the indicator of the request by the user to return to the first system state of the operating system while operating in the second system state of the operating system is stored in the memory.

11. The system of claim 8, further comprising periodically determining whether at least one of the update or another update is available while operating in the first system state of the operating system on the first storage partition.

12. The system of claim 8, wherein the first request to apply the update to the second storage partition while operating in the first system state of the operating system is received from a server, and the system further comprises sending a notification to the server indicative of the request to return to the first system state of the operating system.

13. The system of claim 8, wherein the first system state of the operating system is configured to provide access to at least one feature that is inaccessible by the second system state of the operating system.

14. A non-transitory machine-readable storage medium comprising machine-readable instructions for causing a processor to execute a method for returning a computing system to a previous state, the method comprising:
receiving a first request to apply, on a second storage partition while operating in a first system state of an operating system on a first storage partition, an update to the first system state of the operating system in order to generate a second system state of the operating system;

applying the update to the first system state of the operating system while operating in the first system state of the operating system on the first storage partition in order to generate the second system state of the operating system on the second storage partition;

loading the second system state of the operating system on the second storage partition;

receiving a request by a user to return to the first system state of the operating system from the second system state while operating in the second system state of the operating system on the second storage partition;

loading the first system state of the operating system on the first storage partition based on the request by the user to return to the first system state of the operating system from the second system state;

subsequent to receiving the request to return to the first system state of the operating system, receiving a second request to apply, on the second storage partition while operating in the first system state of an operating system on a first storage partition, the update to the first system state of the operating system in order to generate the second system state of the operating system; and restricting application of the update to the first system state of the operating system stored on the first storage partition in order to generate the second system state of the operating system based on the request by the user to return to the first system state of the operating system from the second system state.

* * * * *